June 26, 1956   R. B. HOPKINS   2,751,993
LEAF SPRING MOUNTING OF TRACTOR DRIVE WHEELS
Original Filed June 9, 1949   2 Sheets—Sheet 1

INVENTOR.
RICHARD B. HOPKINS
BY
Miles Henninger
ATTORNEY

United States Patent Office 2,751,993
Patented June 26, 1956

2,751,993

LEAF SPRING MOUNTING OF TRACTOR DRIVE WHEELS

Richard B. Hopkins, East Lansing, Mich.

Original application June 9, 1949, Serial No. 98,081, now Patent No. 2,650,668, dated September 1, 1953. Divided and this application June 24, 1953, Serial No. 363,758

5 Claims. (Cl. 180—71)

This invention relates to improvements in the springing of land vehicles and particularly to the springing of tractors of the wheel type.

Present tractors, whether designed for industrial or farm use, are not provided with springs excepting insofar as the seat mounting may be resilient or insofar as the seats are provided with resilient cushions. Consequently, such tractors are hard-riding and cannot be safely driven above speeds dependent on the roughness of the surfaces over which the tractor is operating. When the tractor is driven transversely of the rows made in cultivating row crops, the speed of the tractor is especially limited because of the rolling and pitching of the tractor in passing over the rows and the furrows therebetween.

It is, therefore, an object of the present invention to provide springing for land vehicles of which the centers of the wheels are in a line other than the axis of the wheel-vehicle body attachment and about which the wheels and their attachment may oscillate.

Another object of the present invention is to provide springing for land vehicles and particularly for the drive wheels of tractors of the wheel type or for the tracks of a track type tractor.

Another object of the invention is to provide cantilever leaf springs for land vehicles with wheels in which the wheel centers are in a line other than the axis of the drive shaft for such wheels.

Objects and advantages other than those above set forth will be apparent from the following description when read in connection with the accompanying drawing in which.

Figure 1:
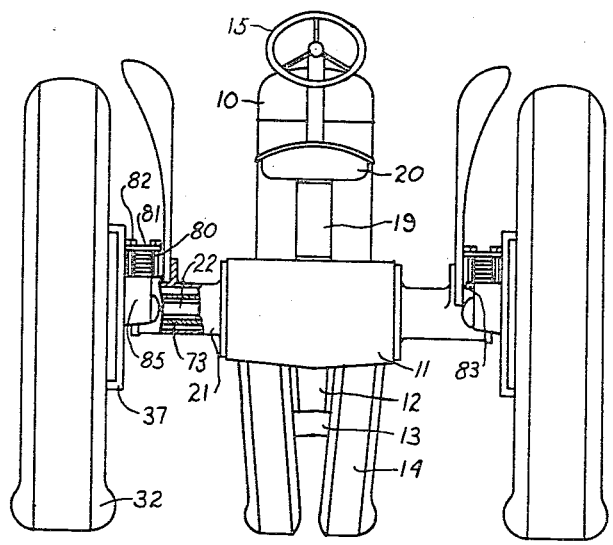
Fig. 1 is a rear view of a wheel type tractor with a portion of the housing for a driving shaft thereof broken away.

Generally, the present invention provides a cantilever leaf spring acting between a drive shaft at some distance from an axle on which is mounted a ground engaging wheel or track. In the present embodiment of the invention, a tube is supported rotatably relative to the casing about the drive shaft and extends from such casing. A housing for power transmission means from the drive shaft to a wheel axle and supporting the wheel axle itself, is fixed to the tube to extend at an angle therefrom for locating the center of the wheel axle a considerable distance away from the drive shaft axis. A multiple graduated leaf spring acts between the casing and the housing as a cantilever for limiting oscillation of the center of the wheel axle about the axis of the drive shaft. In the case of a wheel type tractor, for example, the drive shaft axis is thus parallel with but considerably spaced from the center of the wheel axle, due to the reduced speed usually desired between the drive shaft and the axle. Hence, movement of the wheel axle acts through a considerable lever arm on the springs and thus allows considerable wheel movements to be taken up by the springs without affecting the driver of the tractor.

Referring to the drawings in which like reference numerals relate to like parts, the reference numeral 10 generally designates an engine driven tractor in which the transmission housing, the propeller shaft housing (neither of which is shown) and the differential housing 11 form the frame supporting the engine. At the forward end of the tractor a support 12 extends downwardly and has mounted thereon an axle 13 for the front wheels 14 which are turned by the usual steering wheel 15. Mounted on one of the housings, such as the propeller shaft housing, is a resilient bar 19 supporting a seat 20 for the tractor operator. Casings 21 extend laterally from the ends of the differential housing 11 and severally enclose drive shafts 22 with a gear 23 of relatively small size fixed on the end thereof. All of the housings and casings above indicated also coact to form a substitute for a frame. Several different makes of so-called "frameless" tractors, such as above indicated, are now on the market and no further description of such structure is believed necessary.

Figure 3:
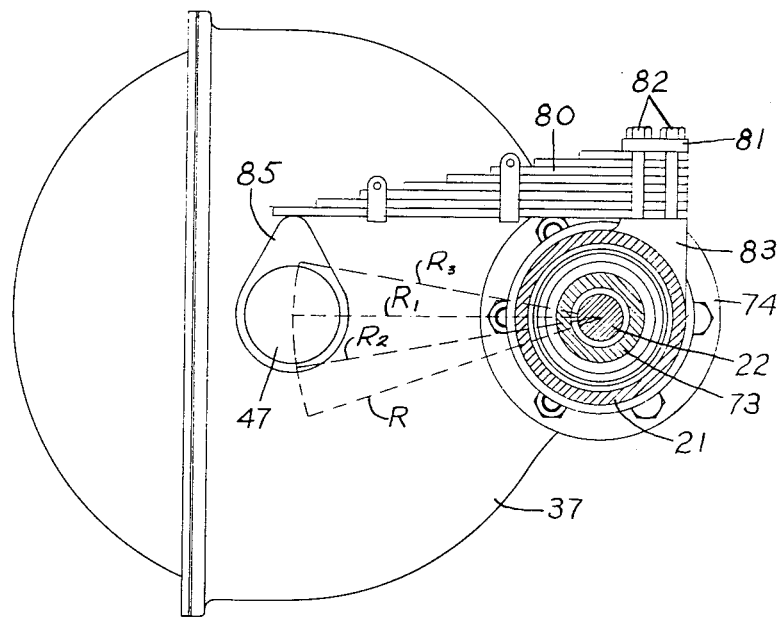
Fig. 3 is a somewhat diagrammatic view on the plane of line 3—3 of Fig. 2 to show the relationship of the axes of the drive shaft and of the driven wheel axle.

The drive shaft 22 extends through the tube designated 73 and provided with a flange 74 at the end thereof projecting from the casing 21. Tube 73 is mounted in bearings 75, 76 in the drive shaft casing 21 and the space between the tube and the casing is closed by a seal 77. As shown in Fig. 3, the heavy end of a graduated multiple leaf spring 80 is fixed on the drive shaft casing 21 by clamp plate 81 and bolts 82 to hold such end of the spring on a pad 83 on the casing. The other end of the leaf spring is free and bears on a contact cam or pad 85 fixed on or formed as a part of the gear housing and shown as relatively closely adjacent to the center line of the wheel axle. If the spring is to be made adjustable as may be required where the tractor is used both to carry varying loads and for drawing loads over rough surfaces, the cam 85 may be made adjustable to secure variable preloading of the spring 80 dependent on the load carried and thus keep the spring action relatively constant for the different usages of the machine. It will be understood that the free end of spring 80 may be supported on the gear housing 37 at any location other than adjacent center line of the wheel axle, to obtain a spring with greater static deflection and lower natural frequency, the frequency most comfortable to drivers being of the order of 70–90 cycles per minute.

The wheel axle 39 may swing about a center on the axis of shaft 22 on the radius R which provides a considerable lever arm. R indicates a line beginning at the center of the drive shaft 22 and drive gear 23 and extending to the center of driven gear 38, axle 39 and wheel 32. The position of line R represents the condition at which the leaf spring 80 is not under load. In other words, the wheel, the tire, the transmission housing, etc., are supported by the ground and the weight of the frame, the engine, etc., are assumed to be so supported as not to be borne by the spring acting through the wheel 32. As the weight of the frame, etc., is applied to the spring, the line R moves through an arc to the position $R_1$ which is the normal position of the wheel center under static conditions of the tractor, that is, when the spring supports its normal portion of the tractor weight. The amount of static deflection determines the natural frequency of vibration of the spring and, to some extent, the degree of comfort obtained by the rider.

The wheel may move either up or down from the position $R_1$ dependent on the surface inequalities encountered. As the wheel moves upward, the leaf spring absorbs energy and the spring releases the stored energy as the wheel moves downward. Hence, the spring absorbs or reduces the severity of the shocks transmitted to the spring supported portions of the tractor.

Figure 4:
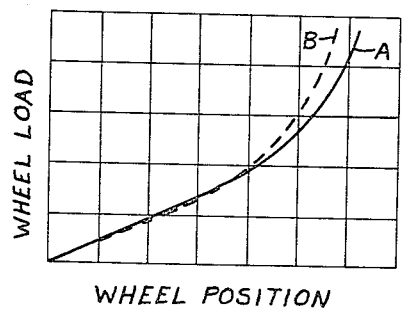
Fig. 4 is a graph showing the action of a structure embodying the present invention.
Figure 2:
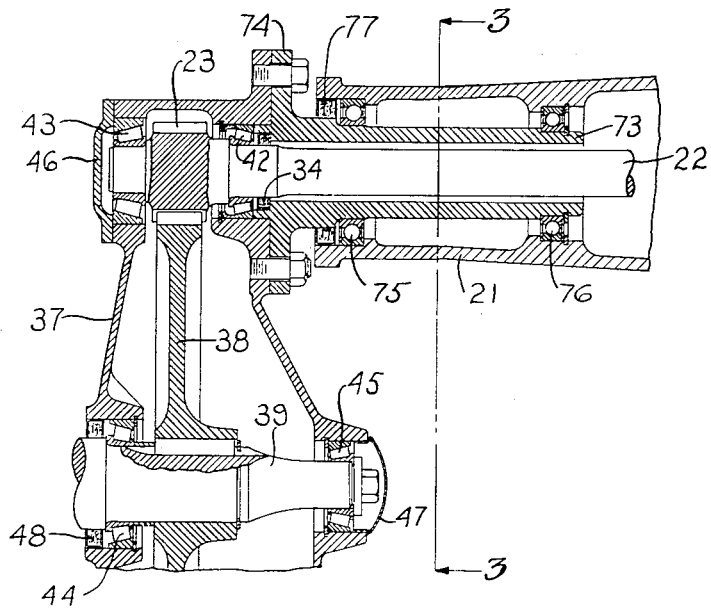
Fig. 2 is an enlarged section of a portion of the drive shaft and its housing and of the driving gears and their housing and of the axle receiving one of the driving wheels.

In Fig. 4, the intersection of the abscissa and the ordinate represents the relationship between displacement and load for the no-load position R as shown in Fig. 3. Curve A illustrates the relationship between vertical wheel displacement and the load required to displace the wheel. Curve B illustrates the relationship between the wheel load and wheel displacement when the wheel starts from an initial position of $R_2$ and moves to a normal static position of $R_3$. Since curves A and B do not coincide, it will be seen that the relationship between load and displacement can be varied through variation of the angular relationship between the initial positions such as R and $R_2$ and the ground by change in the effective length of the lever arm.

It will thus be seen that the present invention provides means for springing a vehicle in which the wheel is mounted at a distance from the axis of the drive shaft supplying power to the wheel. The wheels oscillate about such axis to store energy or to release energy from the springs as required. The present construction requires the minimum of change from present tractor constructions and, in fact, requires no change whatever in the present drive shaft and wheel axle relationships. The wheels are free to move through an arc with no change whatever in the driving element relationships other than change in angular position of the axles, and about the center of the drive shaft. The wheel axle acts at the end of a considerable lever arm from the center of the drive shaft so that wheel movement is readily converted into energy stored in the spring or returned by the spring as the wheel moves in opposite directions. It is not essential that the angular relation between the drive shaft casing and wheel axle housing be a right angle, and any type of means may be employed for transmitting power between the drive shaft and the axle.

Although but one embodiment of the present invention has been illustrated and described, it will be apparent to those skilled in the art that various changes and modifications may be made therein without departing from the spirit of the invention or from the scope of the appended claims.

This application is a division of application Serial No. 98,081, filed June 9, 1949, now Patent No. 2,650,668, dated September 1, 1953.

I claim:

1. In a land vehicle with a drive shaft enclosed in a casing and connected by power transmission means with a wheel axle, a housing inclosing the transmission means and supporting the axle, a tube movably mounted in the drive shaft casing and having the drive shaft extending therethrough, the transmission-axle housing being mounted on the tube and extending at an angle relative to the drive shaft, and a leaf spring acting between the drive shaft casing and the transmission-axle housing for restraining oscillation of the wheel axle about the drive shaft axis.

2. In a land vehicle with a drive shaft enclosed in a casing and connected by a driving gear with a driven gear mounted on a wheel axle, a housing inclosing the gears and supporting the axle, a tube mounted in and extending from the drive shaft casing and having the drive shaft extending therethrough, the gearing-axle housing being fixed on the tube and extending at an angle with the axis of the drive shaft and to a distance therefrom, and a leaf spring fixed on the drive shaft casing and bearing on the transmission-axle housing for restraining oscillation of the axle about the drive shaft axis.

3. In an automotive vehicle having a drive shaft extending laterally from the differential housing thereof, a tubular casing fixed on the differential housing and inclosing the drive shaft, the differential housing and the drive shaft casing forming a portion of the vehicle frame, a tube rotatably mounted in and extending from the casing and having the drive shaft extending therethrough, a housing fixed on the tube and extending therefrom at a right angle to the axis of the drive shaft, a wheel axle rotatably mounted in the housing, gearing connecting the drive shaft with the axle, and a leaf spring fixed at one end on the casing and free at the other end to bear on the wheel axle housing for restraining oscillation of the axle about the drive shaft axis and for absorbing shocks acting on the axle housing.

4. In a land vehicle with a drive shaft enclosed in a casing and connected by a driving gear with a driven gear mounted on a wheel axle, a housing inclosing the gearing and supporting the axle, a tube rotatably mounted in and extending from the drive shaft casing and having the drive shaft extending therethrough, the gearing-axle housing being mounted on the tube, and a multiple graduated leaf spring clamped at one end on and extending over the drive shaft casing with the longest leaf of the spring acting on the casing and bearing on the gearing-axle housing for restraining oscillation of the wheel axle about the drive shaft axis.

5. In an automotive vehicle having a drive shaft extending laterally from the differential housing thereof, a tubular casing fixed on the differential housing and inclosing the drive shaft, the differential housing and the drive shaft casing forming a portion of the vehicle frame, a tube rotatably mounted in and extending from the casing and having the drive shaft extending therethrough, a housing fixed on the tube and extending therefrom at a right angle to the axis of the drive shaft, a wheel axle rotatably mounted in the housing, gearing in the housing for connecting the drive shaft with the axle, and a multiple graduated leaf spring fixed at its least flexible end to the casing and free to bear at its more flexible end on the wheel-axle housing for restraining oscillation of the axle about the drive shaft axis and for absorbing shocks acting on the axle housing.

References Cited in the file of this patent

UNITED STATES PATENTS

| | | |
|---|---|---|
| 1,307,976 | Jacobsen | June 24, 1919 |
| 1,842,074 | Davis | Jan. 19, 1932 |